United States Patent [19]

McDorman et al.

[11] Patent Number: 4,561,035
[45] Date of Patent: Dec. 24, 1985

[54] METHOD AND APPARATUS FOR CLAMPING AND BALANCING ROTATABLE MEMBERS

[75] Inventors: Thomas W. McDorman, San Jose; David K. Myers, Cupertino, all of Calif.

[73] Assignee: Sperry Corporation, New York, N.Y.

[21] Appl. No.: 400,336

[22] Filed: Jul. 21, 1982

[51] Int. Cl.⁴ .............................................. G11B 25/04
[52] U.S. Cl. ..................................... 360/137; 73/468; 74/573 R; 51/169; 360/97
[58] Field of Search ..................................... 360/97–99, 360/86, 133, 137; 369/270–271; 73/457–460, 468–470, 66; 74/573 R; 301/5 A, 5 B; 51/169; 418/151

[56] References Cited

U.S. PATENT DOCUMENTS

| | | | |
|---|---|---|---|
| 2,010,687 | 8/1935 | Burgess | 51/169 |
| 2,377,096 | 5/1945 | Nichols | 74/573 |
| 2,494,756 | 1/1950 | Gruetjen | 74/573 |
| 4,065,799 | 12/1977 | Kaczeus | 360/98 |
| 4,447,899 | 5/1984 | Geyer et al. | 369/275 |

FOREIGN PATENT DOCUMENTS 0062909 10/1932 Fed. Rep. of Germany ........ 73/468

OTHER PUBLICATIONS

IBM Tech. Disc. Bull., B. Beye, "Eliminating Clamp-Induced Stresses in Disk Stacks", vol. 20, No. 10, Mar. 1978, p. 4107.

Primary Examiner—Stuart N. Hecker
Assistant Examiner—David J. Severin
Attorney, Agent, or Firm—John B. Sowell; Thomas J. Scott; Marshall M. Truex

[57] ABSTRACT

A disc is firmly clamped to the end of a rotatable spindle by a coaxial clamping plate spaced from the spindle end by a ring between the plate and disc surface and attached to the spindle by a single coaxial bolt. The flexible plate, thicker at its center than near its periphery, has a substantially flat inner surface which, when stressed by tightening of the bolt, is deformed without exceeding its yield stress to the point where its center section contacts the spindle end surface to provide a constant predetermined clamping force evenly around the disc.

The disc and spindle assembly is rapidly and accurately balanced without loosening the clamped disc from the spindle with an adjustable balancing bar which is attached to the head of the coaxial bolt and which may be properly adjusted by the use of a conventional balancing system which can indicate magnitude and direction of the imbalance.

7 Claims, 6 Drawing Figures

METHOD AND APPARATUS FOR CLAMPING AND BALANCING ROTATABLE MEMBERS

BRIEF SUMMARY OF THE INVENTION

This invention relates to apparatus for the accurate clamping and balancing of rotating members such as computer memory discs and spindle assemblies.

There are many instances where the precise balancing of a rotatable member is required. For example, careful balancing is necessary in the manufacture of high speed engines or fly wheels and is particularly necessary for rotating components in which surface runout cannot be tolerated, such as computer memory discs having magnetically coated surfaces in very close proximity to, or in light contact with, their associated magnetic transducers. While the invention described and claimed herein may be adapted for use on many rotatable objects, it will be described herein for use with computer memory discs because of their need for extremely precise balancing.

Modern computer memory discs are either of the small and popular "floppy" discs formed of a thin flexible magnetically coated plastic material, or the very durable rigid discs generally employed in large computer systems. These rigid metal discs may have a thickness of between approximately 1 mm to 20 mm and may have diameters from about 8 cm up to 1 m, depending upon the size of the system and the size of the memory required. A complete random access disc memory for a large scale system may include a stack of several of such discs on one or more spindles. Proper balancing of such discs and spindles is obviously essential to prevent excess bearing wear, eccentricity resulting in the reading or writing on adjacent concentric memory tracks on the disc surface, and surface runout that may result in transducer "head crashes" and the consequent destruction of both the transducer and magnetic medium on the disc surface.

In general, the prior art rigid discs are provided with a relatively large diameter central pilot hole which closely fits on the end of a spindle so that the disc surface immediately adjacent the pilot hole rests against a shoulder formed between the end portion of the spindle and the main body of the spindle. A clamping plate having a pair of raised concentric rings on one surface which are adapted to engage the disc and the end of the spindle is then applied and a plurality of evenly spaced bolts through the clamping plate positioned between the two concentric rings and threaded into the spindle end are tightened to the point where there is a small predetermined amount of deformation of the clamping plate. This prior art system properly secures the disc to the spindle but, as will be subsequently explained in detail, adds to the problem of disc deformation.

Accurate balancing of the prior art systems is difficult and generally requires the removal of one or more bolts for installation of balancing washers. One type of prior art clamping plate, once deformed by tightening of the bolts, cannot be safely re-used because its yield stress has been exceeded. Even more important, the tightening of the several bolts against the clamping plate creates uneven loading on the surface of the magnetic disc to produce small but dangerous disc surface runout, as previously discussed.

The present invention includes an improved clamping plate which is secured by a single bolt to the end of the spindle and which minimizes uneven loading on the magnetic discs. The invention further includes hardware and a method for accurately and quickly balancing the disc and spindle assembly without use of balancing washers after the discs have been firmly attached to the spindle with the improved clamping ring.

Briefly described, a disc mounted on its spindle is clamped thereto with a circular clamping plate that is thicker at its center than near its periphery and which is bolted into the center of the spindle end by a single bolt through the central axis of the clamping plate. The plate surface adjacent the spindle end is normally flat and separated therefrom by a spacing of approximately 2.5 mm so that, when the single clamping bolt is tightened, the plate surface adjacent the spindle end comes into contact with the spindle end and the opposite or outer end of the plate surface becomes substantially flat. Because the clamping plate is thinner near its outer periphery, all deformation takes place in the thinner plate area and the yield stresses of disc material are not exceeded, thereby permitting re-use of clamping plates.

During assembly, a balancing grid is applied to the exposed or upper surface of the clamping plate. The grid is comprised of a pattern of concentric rings and radial lines that may be either printed on the surface of the plate or may be printed or embossed on a thin disc which is clamped under the single tightly clamped bolt. The clamping bolt itself is unusual in that it is preferably a capscrew with additional threads of larger pitch diameter on the cap or head section upon which a short balancing bar is applied and tightened by a nut.

The system is balanced by first adjusting the balancing bar so that its pointer is at the innermost ring on the grid to indicate that no balance correction is being applied. The system is then applied to a conventional commercial dynamic balancing tester that indicates the magnitude of imbalance and stroboscopically illuminates the appropriate radial lines to indicate the direction of weight to be added. The balance bar nut is then loosened, the bar adjusted, and re-tightened and the adjustment may then be re-checked on the tester without need for loosening the clamping ring from the spindle.

BRIEF DESCRIPTION OF THE DRAWINGS

In the drawings which illustrate the preferred embodiment of the invention.

DETAILED DESCRIPTION

THE PRIOR ART

Figure 1:
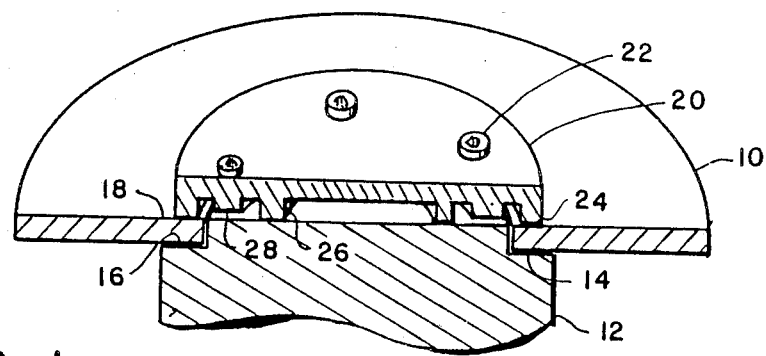
FIG. 1 is a sectional perspective view of the prior art disc and clamping plate.
Figure 2:
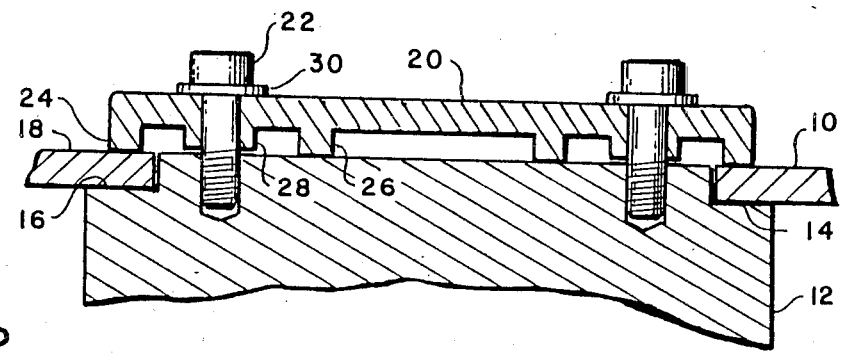
FIG. 2 is a sectional elevation view illustrating the prior art assembly of FIG. 1 in greater detail.

As previously discussed, rigid memory discs must be firmly and accurately attached to their spindles. FIGS. 1 and 2 are sectional views illustrating the prior art hardware for attaching a rigid memory disc 10 to its rotatable spindle 12. The disc 10 is provided with a relatively large diameter central pilot hole which closely fits over a section of reduced diameter at the end of the spindle 12, so that the disc lower surface immediately adjacent the central hole, referred to as the disc hub 16, rests on a shoulder 14 in the periphery of the spindle 12 and formed by the reduced diameter section. In this mounted position, the opposite or top disc surface 18 may be flush with the end surface of the spindle.

The disc 10 is firmly clamped to the spindle 12 by clamping plate 20 which is attached to the end section of the spindle 12 by several evenly spaced bolts 22. The bottom surface of the plate 20 is formed with three spaced annular rings. The outermost ring 24 and innermost ring 26 respectively contact the top surface 18 of the disc 10 and the end surface of the spindle. The center ring 28 extends only to within about 0.020" of the spindle end surface and it is through this center ring 28 that the plurality of evenly spaced bolts 22 are located.

To clamp the disc 10, the bolts 22 are tightened to the point where the spaced lower surface of the center ring 28 comes into contact with the end surface of the spindle 12; that is, an area near the periphery of the clamping plate 20 and between the rings 24 and 26 becomes deformed to form a concavity of 0.020". The disc 10 becomes very firmly attached to the spindle but the tightening of the bolts 22 produces uneven peripheral loading on the disc. Furthermore, unbalances in the spindle and disc assembly can only be corrected by removal of one or more of the disc bolts 22 and by adding small balancing washers, such as the washers 30. A further disadvantage of the prior art system is that the 0.020" deformation of the clamping plate 20 caused by the tightening of the bolts 22 exceeds the yield stresses of the plate 20 which, once tightened, cannot be re-used with any degree of safety.

THE PRESENT INVENTION

Figure 3:
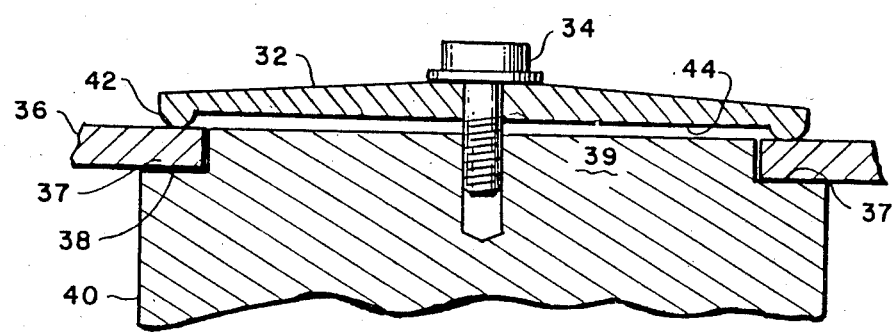
FIG. 3 is a sectional elevation view of the improved clamping plate of the invention illustrated prior to tightening of the clamping bolt.
Figure 4:
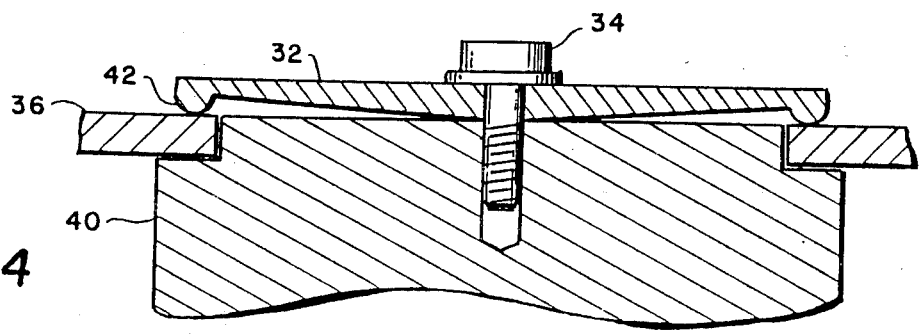
FIG. 4 is a sectional elevation view of the improved clamping plate after tightening of the clamping bolt.

FIGS. 3 and 4 are sectional elevation views illustrating the present invention before and after tightening of the clamping plate 32 by the clamping bolt 34. As illustrated in FIG. 3, the disc hub 37, surrounding the relatively large central pilot hole in a rigid memory disc 36, rests on a peripheral shoulder 38 near the end of a rotatable spindle 40. The spindle end section 39, formed by the shoulder 38 and having smaller diameter than that of the spindle proper, extends through the central pilot hole of the disc 36 and its end surface is substantially flush with the top surface of the disc.

The clamping plate 32, which is preferably a non-frangible or flexible metal disc or approximately 1 cm. maximum thickness, has formed in its bottom or inside surface an annular ring 42 having a diameter that is greater than the central pilot hole in the disc 36 and the diameter of the spindle end section 39 but less than the larger diameter of the spindle and shoulder 38. The ring 42 preferably has a semi-circular cross-section and extends from the relatively flat bottom surface 44 of the plate 32 by an amount that depends upon the diameter of the plate. For example, the ring 42 will extend approximately 0.100" from the bottom flat surface 44 of a plate 32 having a diameter of about 7".

The clamping plate 32 normally has a relatively flat bottom surface 44 and a top surface that is thicker at its center than in the area near its periphery by approximately the same amount as the thickness of the semi-circular ring 42. A single axial hole through the plate 32 accommodates a clamping bolt 34 which may be threaded into a tapped axial hole in the end of the spindle 40.

When the hub 37 of disc 36 is mounted over the spindle end section 39 and rests upon the spindle shoulder 38, and the clamping plate 32 is positioned thereon, the bolt 34 is tightened to the point where the center part of the plate lower surface 44 contacts the end surface of the spindle 40, as shown in FIG. 4. At this point the semicircular annular ring 42 has rolled slightly and the plate has been deformed by 0.100" for the 7" plate. The top exposed surface of the plate 32 is now substantially flat. Because plate 32 is thinner near its periphery, virtually all deformation or deflection takes place within this thinner area which can withstand such a deflection without exceeding the yield stress of the material so that the disc may be reused after having been deflected, if desired.

Figure 5:
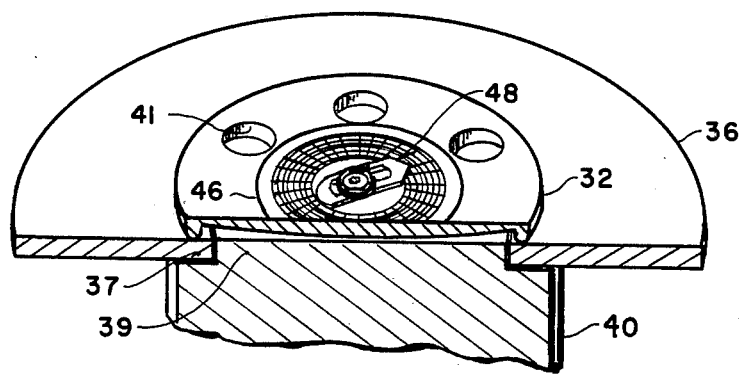
FIG. 5 is a sectional perspective view illustrating the clamping plate with balancing grid and bar.
Figure 6:
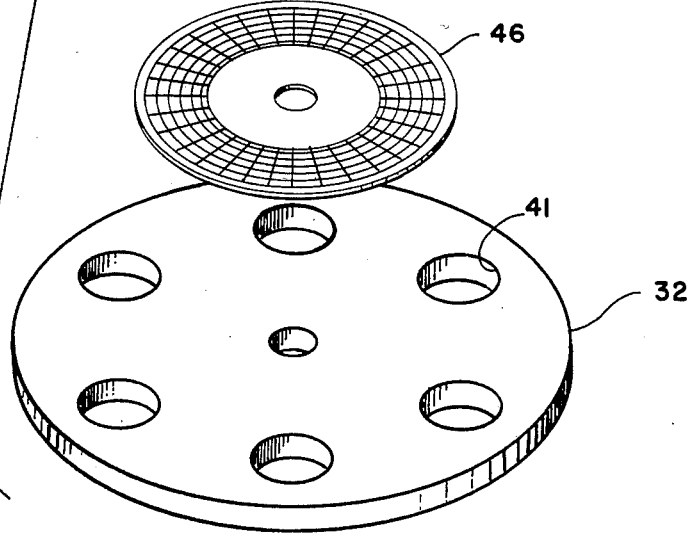
FIG. 6 is an exploded perspective view illustrating the clamping plate with the various balancing components.

FIG. 5 is a sectional perspective view illustrating the memory disc 36 firmly clamped by the clamping ring 32 to the spindle 40. The clamping ring 32 is illustrated with a plurality of equally spaced ventilation holes 41 which form no part of the invention. A balancing grid 46 and the balancing bar 48 are shown attached by the bolt 50 to the top surface of the plate 32. As best illustrated in FIG. 6, bolt 50 has, in addition to the normal threaded shank section 52 that mates with the axial threaded hole in the spindle 40, a threaded head 54 of a substantially larger diameter than that of the shank. The bolt 50 preferably has an axial socket in the end of the cap or head so that it may be rotated with a conventional hexagonal key.

As best illustrated in FIG. 6, a balance calibration grid 46 that may either be printed on a thin disc, as shown, or printed directly on the top surface of the plate 32 is coaxially positioned on the plate. The grid is printed with a plurality of equally spaced concentric rings or lines and a plurality of equally spaced radial lines, as illustrated. The concentric and radial markings are merely identifiers; any desired number of lines may be used and, in the preferred embodiment, the radial lines are equally spaced every 5°, and there are approximately twelve equally spaced concentric lines that are calibrated to represent inch-grams of balance.

The bolt 50, with a suitable washer 56 having a diameter not greater than the pitch diameter of the threaded head or cap 54 of the bolt, is tightened to firmly and permanently attach the memory disc 36 of FIG. 5 to the spindle 40. The balancing bar 48, having an elongated central slot with a width suitable to closely fit over the threaded bolt head 14 and washer 56, is positioned on the surface of the grid 46.

The balancing bar 48 is an elongated metal strip having an indicator point 58 at a first end and is preferably semicircular at its second end 60. The elongated central slot 62 in the bar 48 has a width that will fit over the threaded bolt head 54, as noted above, and a length that will permit the indicator point 58 to be moved between the innermost and outermost concentric lines of the balancing grid 46. The ends of the central slot 62 are preferably semicircular with diameters slightly greater than that of the bolt head 54.

The spacing between the indicator point 58 and the proximal slot end 64 is selected so that when the balancing bar 48 is positioned over the bolt 50 with the bolt head 54 abutting the slot end 64, the indicator point 58 will become aligned with the innermost concentric line on the grid 46, and the balancing bar 48 is itself on a precise center and is not affecting nor contributing to the balance of the assembly. Thus, the indicator point 58 aligned with the innermost concentric line will represent a zero balance correction.

When positioned on the grid 46, balancing bar 48 is retained by a suitable flat washer 66 and a low profile nut 68, which overlies the top surface of the balancing bar and engages with the threads on the bolt head 54.

The complete spindle and disc assembly may be quickly and easily balanced without loosening the bolt 50 from the plate 32 and spindle 40 by the use of commercially available balancing machines, such as the Dynamic Balancing Machine, Type MU6-T, manufactured by Micro Balancing, Inc., of Deer Park, New York. Such machines generally include a test stand which rotates the spindle and disc assembly and indicates the correction, in inch-grams, necessary to achieve balance, and a stroboscope that will hold the grid pattern and balancing bar 48 stationary so that the correct radial line or direction of correction may be accurately determined. When the rotation of the spindle is stopped, the balancing bar 40 is positioned so that its indicator point 58 is aligned with the radial line on the grid 46, as determined by the stroboscope, and the balancing bar is moved so that its indicator point rests upon the concentric line representing the required balancing magnitude as indicated by the balancing machine. The nut 68 is then tightened to firmly clamp the balancing bar 48 and to provide an accurate and rapid balancing of the entire rotating assembly.

We claim:

1. In a rotatable assembly including a disc member having an axial pilot hole for engaging an end portion of a rotatable spindle formed with an annular shoulder having a depth corresponding to the thickness of the disc member for supporting the disc member so that a flat end surface of said end portion of the spindle is coplanar with a surface of the disc member, a means for clamping said disc member to said spindle and for balancing the rotatable assembly comprising;

a flexible circular clamping plate coaxially overlying the disc member and the end of said spindle, said plate having first and second surfaces, the first surface being planar and adjacent said spindle end and separated therefrom by a predetermined spacing, the center of said plate being thicker than the edge thereof by an amount substantially equal to said predetermined spacing;

a coaxial annular ring adjacent the edge of said clamping plate and between said first surface thereof and said disc member, said ring having a diameter greater than that of the axial pilot hole and less than the outside diameter of the annular shoulder on said spindle, said ring having a predetermined thickness substantially equal to said predetermined spacing for spacing said first surface of said plate from the adjacent surfaces of said disc member and said spindle end;

a calibration grid overlying said clamping plate, said grid having a central hole;

a bolt extending through said grid central hole, an axial hole in said clamping plate and engaging a tapped coaxial hole in said spindle, the tightening of said bolt drawing the central part of the first surface of said plate toward contact with the end surface of said spindle for applying equal clamping forces to said disc member, said bolt having a cylindrical shaped head with external threads thereon;

a balancing bar having an elongated central slot slideable over the externally threaded surface of said bolt head and having an indicating point at a first external end, said bar being constructed to contribute a zero balance correction when said threaded bolt head abuts the end of said slot proximal said external indicating point; and a threaded nut engageable with the external threaded head on said bolt for clamping said balancing bar to said calibration grid and said clamping plate.

2. The clamping means claimed in claim 1 wherein said coaxial annular ring is formed in said first surface and adjacent the periphery of said disc member.

3. The clamping means claimed in claim 2 wherein said annular ring has a cross-section proximating a semicircle.

4. The clamping means claimed in claim 1 wherein said calibration grid comprises a plurality of equally spaced radial lines for representing a direction of imbalance, and a plurality of equally spaced concentric lines for representing magnitude of imbalance, the innermost of said concentric lines representing zero correction when aligned with said balance bar point.

5. The clamping means claimed in claim 4 wherein said calibration grid is printed upon said opposite plate surface.

6. The clamping means claimed in claim 4 wherein said calibration grid is printed on a disc coaxially mounted on said plate opposite surface and retained thereon by said bolt.

7. A method for balancing a rotatable disc and spindle assembly having an externally threaded member coaxial with the rotational axis of said assembly and extending from a surface normal to said rotational axis, said method comprising the steps of:

coaxially positioning a balancing grid on the surface of said rotatable assembly, said grid comprising a plurality of equall spaced radial lines for representing a direction of imbalance, and a plurality of equally spaced concentric lines representing the magnitude of the imbalance;

affixing a balancing bar to the threaded member, said balancing bar having an indicator at its first end and an elongated internal slot slidable on said threaded member;

adjusting said indicator to coincide with the innermost concentric line on said balancing grid wherein said balancing bar will contribute zero balance correction to said system;

firmly tightening said bar against said grid with a nut engaging the threads of said externally threaded coaxial member;

spinning said assembly on a balance indicating system that indicates magnitude of imbalance and the rotational adjustment of said balancing bar for direction of correction;

loosening said bar tightening nut and adjusting said balancing bar along its elongated internal slot so that said indicator coincides with the intersection of said radial and concentric lines as indicated by said balance indicating system; and tightening said bar tightening nut.

* * * * *